United States Patent
van der Raadt et al.

(10) Patent No.: US 10,230,843 B2
(45) Date of Patent: Mar. 12, 2019

(54) USER INTERFACE EXTENSION FOR SIMPLIFIED COMMUNICATIONS DEVICE

(71) Applicant: GreatCall, Inc., San Diego, CA (US)

(72) Inventors: Krijn van der Raadt, San Diego, CA (US); Scott Brenton, Poway, CA (US)

(73) Assignee: GreatCall, Inc., San Diego, CA (US)

( * ) Notice: Subject to any disclaimer, the term of this patent is extended or adjusted under 35 U.S.C. 154(b) by 503 days.

(21) Appl. No.: 14/510,011

(22) Filed: Oct. 8, 2014

(65) Prior Publication Data

US 2016/0105557 A1    Apr. 14, 2016

(51) Int. Cl.
| | |
|---|---|
| *H04W 72/00* | (2009.01) |
| *H04M 3/44* | (2006.01) |
| *H04W 4/80* | (2018.01) |
| *H04M 3/42* | (2006.01) |

(52) U.S. Cl.
CPC .............. *H04M 3/44* (2013.01); *H04W 4/80* (2018.02); *H04M 3/42178* (2013.01); *H04M 2207/18* (2013.01); *H04M 2250/04* (2013.01)

(58) Field of Classification Search
CPC ............ H04M 11/04; H04M 3/42178; H04M 2250/04; H04M 2207/18; H04M 3/44; H04W 4/008
USPC .............................. 455/564, 460, 551, 404.1
See application file for complete search history.

(56) References Cited

U.S. PATENT DOCUMENTS

| | | | |
|---|---|---|---|
| 4,655,279 A | 4/1987 | Harmon | |
| 6,044,257 A * | 3/2000 | Boling et al. | 455/404.2 |
| 6,226,510 B1 * | 5/2001 | Boling et al. | 455/404.2 |
| 6,636,732 B1 * | 10/2003 | Boling et al. | 455/404.1 |
| 6,792,298 B1 * | 9/2004 | Tasto | 455/575.8 |
| 6,807,564 B1 * | 10/2004 | Zellner et al. | 709/206 |
| 7,940,168 B2 * | 5/2011 | Needham et al. | 340/539.12 |
| 8,116,724 B2 * | 2/2012 | Peabody | 455/404.2 |
| 8,359,000 B2 * | 1/2013 | Fee | 455/404.2 |
| 8,478,229 B2 * | 7/2013 | Velusamy et al. | 455/404.2 |
| 8,489,066 B2 | 7/2013 | Imming et al. | |
| 8,837,683 B2 * | 9/2014 | Conroy | 379/38 |
| 2007/0229286 A1 * | 10/2007 | Huang | 340/573.1 |
| 2008/0005301 A1 * | 1/2008 | Li et al. | 709/223 |
| 2008/0166992 A1 * | 7/2008 | Ricordi et al. | 455/404.2 |
| 2009/0322513 A1 * | 12/2009 | Hwang et al. | 340/539.12 |
| 2010/0205534 A1 * | 8/2010 | Zellner et al. | 715/733 |

(Continued)

OTHER PUBLICATIONS

Bluetooth® Special Interest Group, et al. (2011). *Bluetooth Secure Simple Pairing Using NFC* [Application Document]. Wakefield, MA: Near Field Communication Forum, Inc. 32 pages.

(Continued)

*Primary Examiner* — Amancio Gonzalez
(74) *Attorney, Agent, or Firm* — Kilpatrick Townsend & Stockton LLP

(57) ABSTRACT

A portable communication device includes a processor, a memory holding data and instructions, a simplified user input interface for manually initiating functions of the portable communication device, a mobile telephone transceiver, and a short-range wireless communication transceiver. The devices uses the short-range transceiver to retrieve information from an external data storage device such as an NFC tag, and based on the received data, initiate a function of the portable communication device. Functions that may be initiated include pairing with another device, downloading and installing application software, and receiving and forwarding data from a health monitoring device.

13 Claims, 5 Drawing Sheets

(56) References Cited

U.S. PATENT DOCUMENTS

| | | | | |
|---|---|---|---|---|
| 2011/0059719 | A1* | 3/2011 | Spielvogel et al. | 455/404.1 |
| 2011/0281550 | A1* | 11/2011 | Peabody | 455/404.2 |
| 2012/0002792 | A1* | 1/2012 | Chang | 379/40 |
| 2012/0052833 | A1* | 3/2012 | Pendse | 455/404.1 |
| 2012/0088466 | A1* | 4/2012 | Conroy | G06F 19/322 455/404.1 |
| 2013/0148790 | A1* | 6/2013 | McGary et al. | 379/45 |
| 2014/0171152 | A1* | 6/2014 | Dempsey | 455/564 |
| 2014/0242908 | A1* | 8/2014 | Rosenberg | H04B 5/0056 455/41.1 |
| 2015/0133047 | A1* | 5/2015 | Smith | G06K 7/10198 455/41.1 |

OTHER PUBLICATIONS

Indiegogo. (2014). *DIMPLE.IO—Your own custom Android buttons*! [Brochure]. Retrieved from <https://www.indiegogo.com/projects/dimploe-io-your-own-custom-android-buttons> on Jul. 29, 2014. 23 pages.

Lifecomm. (2012). *Lifecomm User Guide*. Atlanta, GA: Lifecomm. 19 pages.

Qualcomm. (2011). *mPERS Module Internal Photographs* [Technical Data Document No. 80-H1151-4 Rev. A] San Diego, CA: QualComm, Inc. 11 pages.

Samsung. (2014). *Samsung TecTile Programmable NFC Tags* [Brochure]. Retrieved from <http://www.samsung.com/us/mobile/cell-phones-accessories/EAD-X11SWEGSTA> on Jul. 30, 2014. 10 pages.

Zomm, LLC., "Zomm™ alarmingly Smart: World's First Wireless Leash™ for Mobile Phones Online User Manual", May 5, 2011, 30 pages.

Verizon, "Verizon Sureresponse™ User Guide," Verizon Wireless, 2012, 65 pages.

* cited by examiner

USER INTERFACE EXTENSION FOR SIMPLIFIED COMMUNICATIONS DEVICE

BACKGROUND OF THE INVENTION

Portable electronic communication devices such as cellular telephones have become ubiquitous, and various kinds and models of devices have evolved to address specific needs. For example, "smart" phones often include touchscreen displays for displaying information to users and for accepting inputs from the users, and may include the capability to install application software to enhance the functions of the smart phone. Other more traditional phones may use an electromechanical keypad for entry of phone numbers to call and other information, and may use a display only for presenting information.

For some uses, specialized communication devices have been developed having greatly simplified user input interfaces. Some devices may lack any graphical display, and may include limited input capability, for example a single button for initiating a call to a previously-specified telephone number. While such a simplified user input interface is helpful to avoid mistakes and confusion on the part of the user of the device, the simplification comes at the cost of flexibility. For example, the device may have capabilities that are difficult or impossible to utilize using such a simplified input interface.

Some prior art devices with single-button user interfaces have prescribed elaborate protocols for pressing the single button to access multiple capabilities. For example, combinations of short and long button presses, closely-spaced presses (e.g., "double clicks"), and the like signal the device to take certain actions. Such systems are error prone, and difficult for the user to remember.

BRIEF SUMMARY OF THE INVENTION

According to one aspect, a portable communication device comprises a processor, a memory holding instructions for the processor, and a simplified user input interface for manually initiating at least one function of the portable communication device. The simplified user input interface has insufficient controls to enter an arbitrary telephone number without resorting to assigning multiple meanings to a control. The portable communication device further comprises a mobile telephone transceiver and a short-range wireless communication transceiver. The instructions, when executed by the processor, cause the portable communication device to wirelessly detect an external data storage device via the short-range wireless communication transceiver of the portable communication device, receive data stored in the external data storage device via the short-range wireless communication transceiver, and initiate a particular function of the portable communication device. The particular function is selected based on the content of the data received from the external data storage device, and the particular function is not accessible via the simplified user input interface. In some embodiments, the simplified user input interface includes fewer than 10 controls for initiating functions of the portable communication device. In some embodiments, the simplified user input interface includes a button that, when actuated, initiates a call to a predetermined telephone number. In some embodiments, the simplified user input interface further comprises a volume control. In some embodiments, the short-range wireless communication transceiver includes a near field communication (NFC) transceiver. In some embodiments, the short-range wireless communication transceiver includes a radio frequency identification transceiver, an ultrasound transceiver, or an infrared transceiver. In some embodiments, the portable communication device emits a radio frequency field via the short-range wireless communication transceiver, to excite the external data storage device. In some embodiments, the portable communication device further comprises a medium-range wireless communication transceiver, and the particular function comprises sending pairing information to an active external device via the medium-range wireless communication transceiver. In some embodiments, the medium-range wireless communication transceiver includes a Bluetooth wireless communication transceiver. In some embodiments, the instructions, when executed by the processor, further cause the portable communication device to download, via the mobile telephone transceiver, application software for interacting with the active external device. In some embodiments, the active external device is a health monitoring device, and the instructions, when executed by the processor, further cause the portable communication device to receive readings of health parameters from the active external device via the medium-range wireless communication transceiver, and forward the readings to a remote server via the mobile telephone transceiver. In some embodiments, the active external device is selected from the group consisting of a heart rate monitor and a blood glucose monitor. In some embodiments, the portable communication device is caused to detect the external data storage device, pair with the active external device, download the application software, and receive and forward the readings of health parameters without any interaction from a user of the portable electronic device once the portable electronic device is active and within range of the external data storage device. In some embodiments, the portable communication device is combined with a booklet containing one or more pages and two or more particular passive external devices affixed to one or more of the pages, at least one of the particular passive external devices containing data different from the data in any other of the passive external devices contained in the booklet, wherein the passive external devices are reactive to the short-range wireless communication transceiver of the portable communication device, and are positioned farther apart in the booklet than the range of the short-range wireless communication transceiver.

According to another aspect, a booklet comprises one or more pages and two or more passive data storage devices affixed to the same or different pages of the booklet. The passive data storage devices are reactive to a wireless communication transceiver having a maximum range such that upon excitation, each of the passive data storage devices transmits at least some of the data it stores. At least one of the passive data storage devices stores data different from the data stored by any of the other passive data storage devices, and the passive data storage devices are positioned in the booklet farther apart than the maximum range of the wireless communication transceiver. In some embodiments, each of the passive data storage devices is reactive to a near field communication (NFC) transceiver. In some embodiments, each of the passive data storage devices is affixed to its respective page using a removable adhesive.

According to another aspect, a method of operating a portable communication device comprises emitting a wireless signal via a short-range wireless communication transceiver, the signal being of a kind to excite a passive external data storage device. The method further comprises receiving a response from the passive external storage device via the short-range wireless communication transceiver, the response including data read from the passive external data storage device. The method further comprises, based on the content of the received data, initiating pairing between the portable communication device and an active external device via a medium-range wireless communication transceiver. The method further comprises downloading, via a wireless telephone transceiver, application software for interacting with the active external device, automatically installing the application software on the portable communication device, and interacting with the active external device. In some embodiments, the steps of the method are performed without any interaction with a user of the portable communication device once the portable communication device is active and placed within range of the passive external data storage device. In some embodiments, the method further comprises receiving readings of health parameters from the active external device via the medium-range wireless communication transceiver, and forwarding the readings to a remote server via the mobile telephone transceiver. In some embodiments, the passive external data storage device is a first passive external data storage device, the active external device is a first active external device, and the method further comprises: emitting the wireless signal via a short-range wireless communication transceiver, the signal of a kind to excite a second passive external data storage device; receiving a response from the second passive external storage device via the short-range wireless communication transceiver, the response including data read from the second passive external data storage device; based on the content of the received data, initiating pairing between the portable communication device and a second active external device via a medium-range wireless communication transceiver; downloading, via a wireless telephone transceiver, application software for interacting with the second active external device; automatically installing the application software on the portable communication device for interacting with the second active external device; and interacting with the second active external device.

According to another aspect, a portable electronic device comprises a processor, a memory holding instructions for the processor, and a simplified user interface for manually initiating at least one function of the portable communication device. The simplified user input interface has insufficient controls to enter an arbitrary telephone number without resorting to assigning multiple meanings to a control. The portable electronic device further comprises a medium-range wireless communication transceiver and a short-range wireless communication transceiver. The instructions, when executed by the processor, cause the portable communication device to wirelessly detect an external data storage device via the short-range wireless communication transceiver of the portable communication device, receive data stored in the external data storage device via the short-range wireless communication transceiver, and communicate information to a third device via the medium-range wireless communication transceiver, the information indicating a particular configuration to be adopted by the third device.

DETAILED DESCRIPTION OF THE INVENTION

Figure 1:
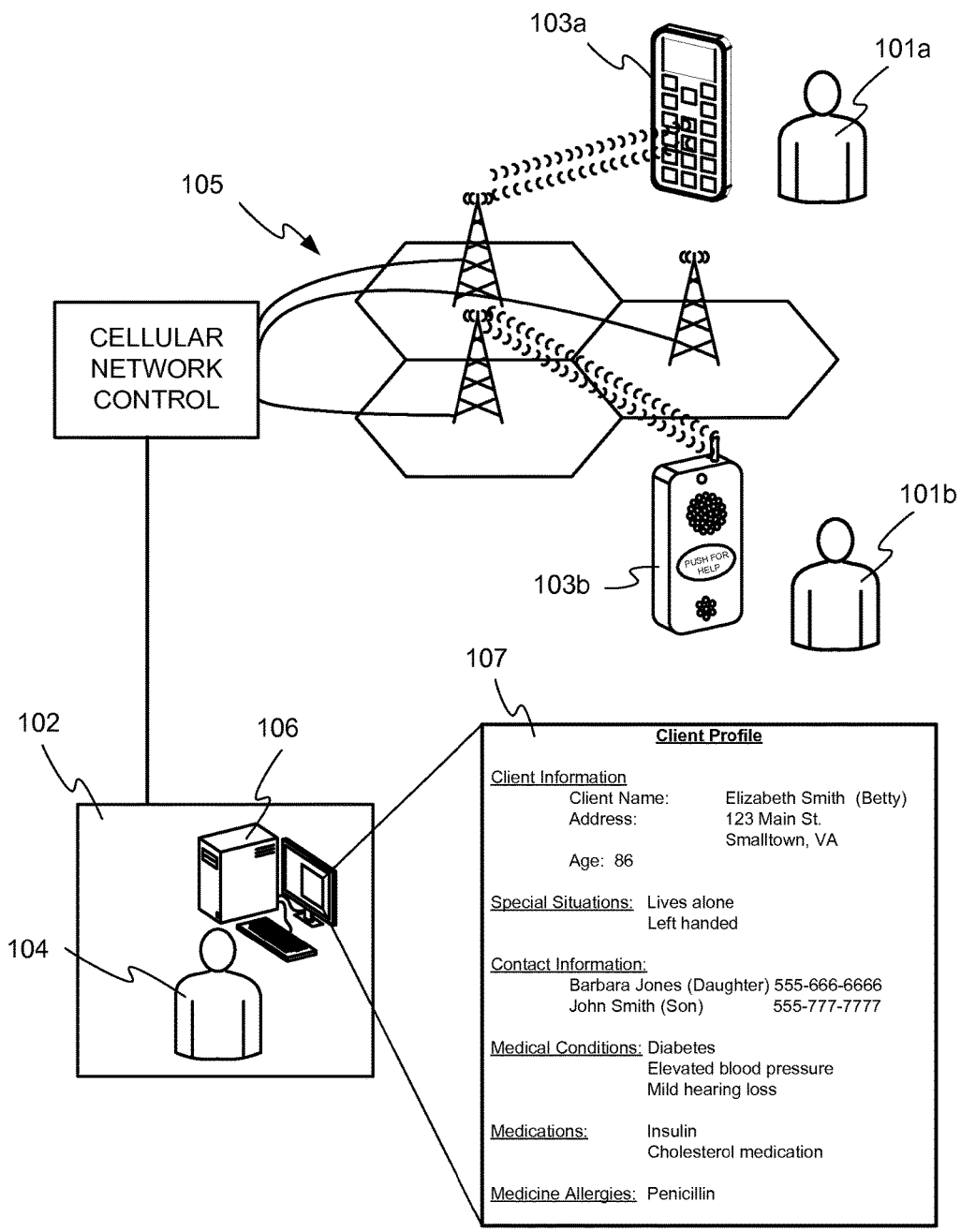
FIG. 1 illustrates the operation of a telephone-based assistance service with which embodiments of the invention may find utility.

Embodiments of the invention may find particular utility in conjunction with an assistance service, as depicted in FIG. 1. In the example arrangement of FIG. 1, clients 101*a* and 101*b* of a private response center (PRC) 102 use their portable electronic devices 103*a* and 103*b* to reach PRC 102. PRC 102 may be reachable by dialing a particular telephone number. PRC 102 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. PRC 102 may be staffed by customer service representatives 104 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package.

In one example scenario, the service provider that operates PRC 102 may also be a cellular telephone service provider, and may offer a private assistance service as an adjunct to cellular telephone service. PRC 102 can be contacted through a phone number, speed dial or other shortcut, for example by activating a 5 and * key combination on a telephone, by activating an application on a smart phone, or by other methods. While FIG. 1 illustrates contacting PRC 102 using cellular devices through cellular network 105, clients of PRC 102 may reach PRC 102 by other means as well, for example via conventional wire line telephone, using a voice-over-Internet-protocol (VOIP), or any other suitable connection method that enables a user to reach PRC 102. PRC 102 may be reachable via multiple methods.

Private response center 102 is not intended to be a substitute for a public safety answering point. A client of the service offered by private response center 102 would still be expected to dial 9-1-1 (or another emergency number appropriate for the client's geographical location) to reach official emergency response personnel in the event of an emergency.

Even so, a client may call PRC 102 during an emergency for any of a number of reasons. For example, the client may simply be more comfortable asking for assistance from PRC 102 than with calling 9-1-1, or the client may be using a simplified portable device such as device 103*b* that calls PRC 102 directly when actuated. Once customer service representative 104 recognizes that the client has a medical emergency, he or she can notify official emergency services personnel, and may remain on the line after the emergency services personnel arrive, for example to provide information from the client's profile that may relate to the client's condition, or for other purposes.

PRC 102 includes a computer system 106 that may be used for various functions. For example, information about calls from clients may be displayed to customer service representative 104. Computer system 106 may store personal information gathered from clients that may be helpful in rendering assistance to the clients. Computer system 106 may assist customer service representative 104 in the performance of his or her job, for example automating telephone dialing and the like. While computer system 106 is illustrated as a single computer, it will be recognized that the term "computer system" encompasses many different kind of installations, including systems of multiple computers linked together. The multiple computers may be co-located or widely dispersed.

Computer system 106 may also store a personal profile of each client. For example, upon enrollment in the service provided by PRC 102, a client may provide information about his or her medical conditions, medications, and other information that may assist PRC 102 in assisting the client. The client may also provide contact information for family members or other entities that can be contacted in the event of an emergency, or who are to be informed about the health and well-being of the client. An abbreviated example personal profile 107 is shown in FIG. 1. Upon receiving a call from a client of PRC 102, computer system 106 may display the client's personal profile to the customer service representative handling the call, so that the customer service representative can better assist the client, and can immediately identify contacts who may need to be notified of the call or included in a response to the call.

In the example system of FIG. 1, client 101a uses a smart phone 103a, and can contact PRC 102 by dialing a telephone number, by activating application software, or the like. Smart phone 103a includes a touchscreen display, allowing client 101a access to a wide variety of functions, and facilitating the installation of new application software to add still further functions.

Figure 2:
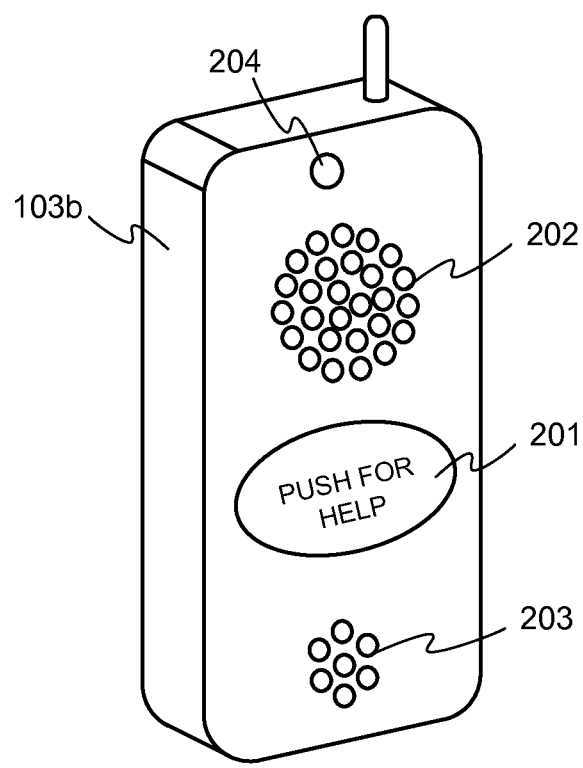
FIG. 2 illustrates a communication device having a simplified user input interface, in accordance with embodiments of the invention.

However, client 101b uses a device 103b with a simplified user input interface. Device 103b is shown in more detail in FIG. 2. For the purposes of this disclosure, a simplified user input interface is one that has insufficient controls (separate electromechanical buttons, simulated buttons on a touchscreen display, or the like) to enter an arbitrary telephone number without resorting to assigning multiple meanings to a control. It will be recognized that this means a simplified user input interface includes fewer than 10 discrete input controls for initiating functions of the device. Many devices having simplified user input interfaces may be dedicated-purpose devices, designed to facilitate a small number of related functions.

For example, communications device 103b may internally be a fully-featured cellular telephone, but has a simplified input interface comprising (in addition to other user interface features described below) a single button 201 for manually initiating functions of device 103b. Communications device 103b may also be referred to as a "fob" or an "emergency communicator." A client of PRC 102 may wear communications device 103b on his or her person, and can use it to contact private response center 102 whenever assistance is needed. For example, communications device 103b may be configured to dial private response center 102 when button 201 is pressed. This greatly simplified input interface may be especially helpful to clients with impairments such as poor vision or coordination that make it difficult to operate a conventional cellular telephone that has many small keys. The single-button interface assures that private response center 102 will be called without the client having to press a sequence of keys. In the event of an emergency, the client may be distraught or disoriented, and the simplified input interface increases the chance of the client reaching private response center 102.

While example device 103b includes only single button for calling a preselected telephone number, embodiments of the invention may use other kinds of devices with other kinds of simplified user input interfaces. For example, embodiments of the invention may use dedicated-purpose wireless devices such as a garage-door opener (typically having a single button), an automotive remote entry fob (typically having about 4 buttons), or another kind of device with a simplified user input interface.

Referring again to FIG. 2, example device 103b also includes a speaker 202 and microphone 203 for providing telephone communication. An indicator light 204 may be present, for indicating proper functioning, fault states, or the like, but example device 103b lacks any graphical display. Certain other controls, for example an on/off switch, volume controls, or the like may be present, but are not considered buttons for initiating functions of device 103b.

Figure 3:
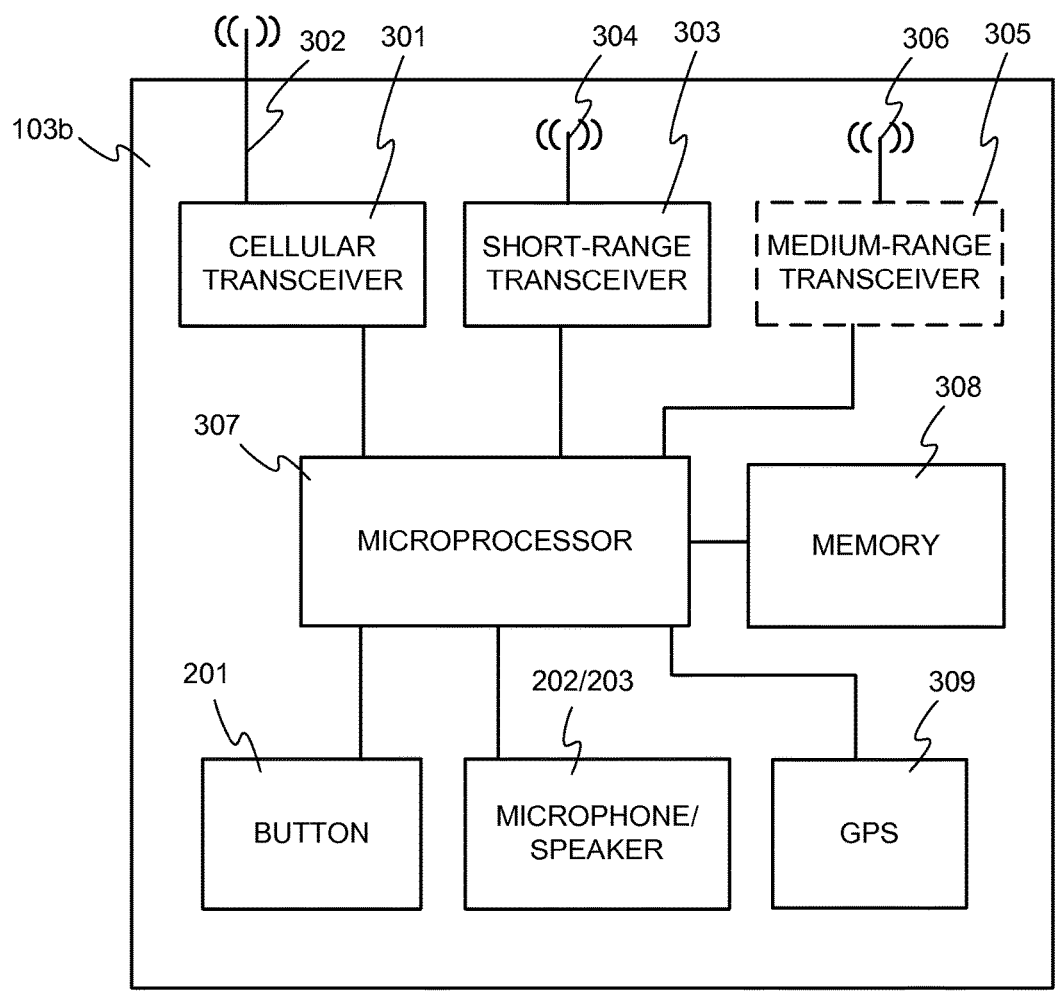
FIG. 3 illustrates a simplified schematic diagram of the communication device of FIG. 2.

FIG. 3 illustrates a simplified schematic diagram of example electronic architecture of communications device 103b. Device 103b includes a cellular telephone transceiver 301 and antenna 302 for communicating via cellular network 105, for example. Device 103b also includes a short-range wireless communication transceiver 303 and antenna 304. Short-range wireless communication transceiver may be, for example, a near field communication (NFC) transceiver, compatible with specifications promulgated by the NFC Forum, Inc., of Wakefield, Mass., USA. In a typical NFC interaction, one device acts as an initiator of a data transfer. The initiator generates a radio frequency (RF) field that is sensed by a target device. The target device may be passive, deriving power for its operation from the RF field generated by the initiator, although "peer-to-peer" communications are also possible between two powered devices. The initiator and target can then exchange data.

While NFC communications can theoretically have a workable range of up to 20 cm, more typically NFC is limited to a practical working distance of about 4 cm or less. For the purposes of this disclosure, a "short-range wireless communication transceiver" is one having a typical maximum working range of 30 cm or less. Other kinds of communication protocols than NFC may be used in embodiments of the invention, and embodiments of the invention may use an NFC or other transceiver having much more restricted working ranges, for example 20 cm, 10 cm, 5 cm, 4 cm, 3 cm, 2 cm, 1 cm, or another maximum working range.

In other embodiments, short-range wireless communication transceiver 303 may be a radio frequency identification (RFID) transceiver, an infrared transceiver, and ultrasound transceiver, or another kind of transceiver.

Device 103b may further include a medium-range wireless communication transceiver 305 and antenna 306. Medium-range wireless communication transceiver 305 may be, for example a Bluetooth® transceiver compatible with specifications promulgated by the Bluetooth SIG, Inc., of Kirkland, Wash., USA. Bluetooth enables devices to communicate wirelessly over distances of up to about 100 meters, depending on the power class of the Bluetooth devices involved. A low-power version of Bluetooth, called Bluetooth LE or Bluetooth Smart is available, and while capable of communication over similar distances, is targeted at applications involving devices only a few meters apart at most. For the purposes of this disclosure, a "medium-range wireless communication transceiver" is one having a designed working range of 30 cm to 150 meters. Other kinds of communication protocols than Bluetooth may be used in embodiments of the invention, and embodiments of the invention may use Bluetooth or other transceivers having much more restricted working ranges, for example 50 meters, 25 meters, 10 meters, 5 meters, 2 meters, 1 meter, 50 cm, or another maximum working range.

Referring again to FIG. 3, example device 103b includes a microprocessor 307 that controls the operation of device 103b, under control of instructions stored in a memory 308. Memory 308 may include volatile memory, nonvolatile memory, or a combination of these, and may store user data, application programs, temporary variables, and a variety of other kinds of information.

As is described above, example device 103b includes button 201, speaker 202, and microphone 203. Device 103b may also include a global positioning system (GPS) receiver 309, for receiving signals from GPS satellites, enabling communication device 103b to accurately ascertain its geographical location when enough GPS satellites are "visible" to device 103b. Device 103b may use GPS information in a variety of ways, for example to transmit its location periodically or when requested to PRC 102, as part of a client monitoring service offered by the operator of PRC 102. More information about the operation and possible use of GPS information by a communication device can be found in U.S. Pat. No. 8,489,066 issued Jul. 16, 2013 and titled "Systems and Methods for Identifying Caller Locations", the entire disclosure of which is hereby incorporated by reference herein.

As is explained above, the user interface of communication device 103b is intentionally simplified, in order to address a particular client need. Communication device 103b includes internal circuitry that could be used for a variety of other functions, but the simplified user input interface does not provide any mechanism for the user to access any other functions.

Figure 4:
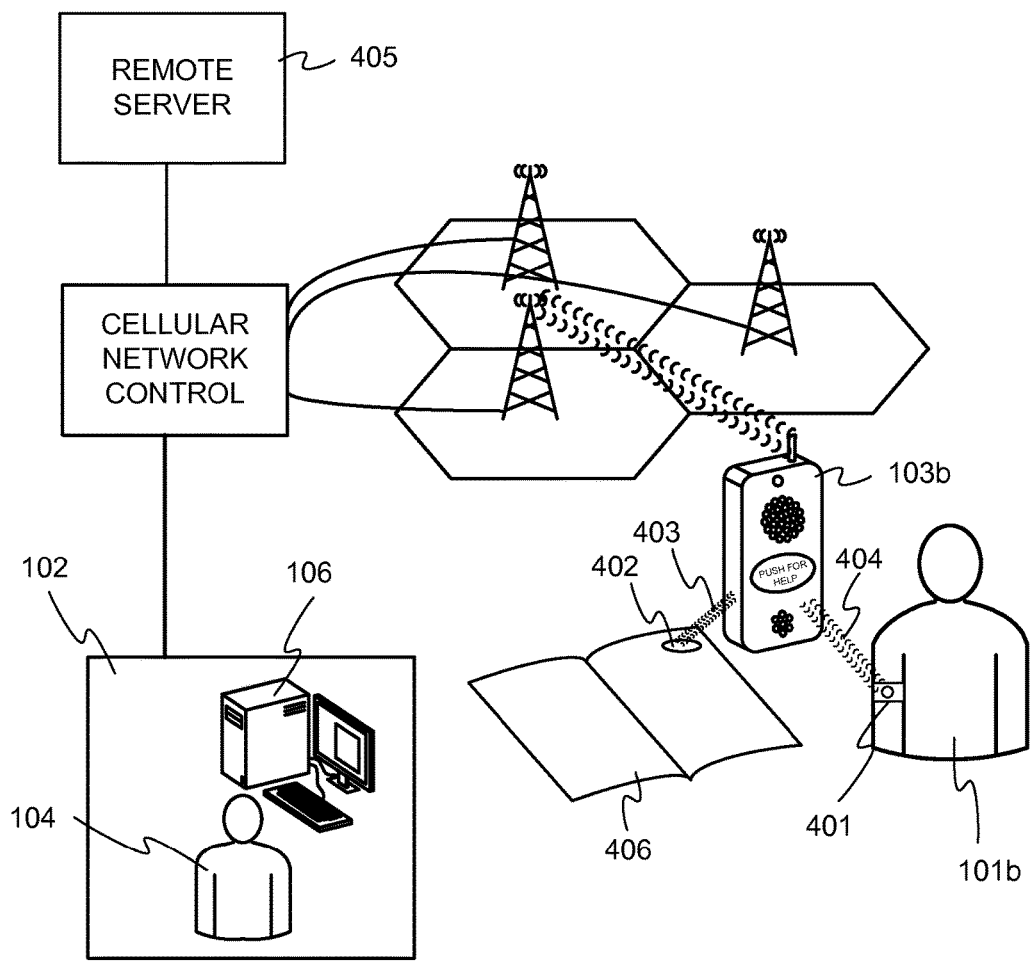
FIG. 4 illustrates another example system in which embodiments of the invention may find utility.

Embodiments of the invention enable a device with a simplified user input interface to perform functions not accessible through the user interface of the device. FIG. 4 illustrates an example system in which embodiments of the invention may find utility.

In the example scenario of FIG. 4, client 101b has obtained a health monitoring device 401. Health monitoring device 401 may be, for example, a heart rate monitor, blood pressure monitor, blood glucose monitor, or another kind of monitoring device. Health monitoring device 401 includes a medium-range wireless communication transceiver so that it can report readings to another device wirelessly. For example, health monitoring device 401 may include a Bluetooth interface or another kind of medium-range wireless communication interface.

If client 101b were using a smart phone or other device having a fully-featured user interface, client 101b may accomplish pairing and setup of the link between the smart phone and health monitoring device 401 using user interface commands. However, because client 101b is using simplified communication device 103b, little or no user direction is possible.

In embodiments of the invention, pairing and setup of the link between communication device 103b and health monitoring device 401 are accomplished using other wireless capabilities of communication device 103b. In the illustrated example, client 101b places communication device 103b near a passive data storage device 402 external to device 103b. Passive external storage device 402 is excited by short-range RF signal 403, and establishes communication with device 103b. Data from passive data storage device 402 is read into communication device 103b, which can act on the data. Passive data storage device 402 may include, for example, an NFC "chip", a radio frequency ID (RFID) chip, an ultrasound transceiver, or another kind of communication mechanism. A storage device 402 using including an NFC chip may be referred to as an "NFC tag."

While the example of FIG. 4 uses a passive data storage device, it will be recognized that the invention may be embodied in a system in which data is received from an active device, for example an active NFC device.

Once communication device 103b has received the data from storage device 402, communication device 103b can act on the data. For example, the received data may include a pairing code to use in pairing with health monitoring device 401. Communication device 103b can then pair with health monitoring device 401, establishing communication 404 with health monitoring device 401 using the medium-range wireless transceiver in communication device 103b. Such a pairing may proceed according to the techniques described in "Bluetooth Secure Simple Pairing Using NFC", published by the Bluetooth SIG, and incorporated by reference herein.

The data received from storage device 402 may include other information as well, for example a network address of a remote server 405 to which data from health monitoring device 401 is to be sent. Remote server 405 may be operated, for example, by the manufacturer or supplier of health monitoring device 401, by a clinic or other health facility treating or monitoring client 101b, by PRC 102, or by another entity.

The data received from storage device 402 may include a network address and instructions for downloading application software to communication device 103b, for interacting with health monitoring device 401. Preferably, the pairing and application software is installed on communication device 103b without any interaction from user of communication device 103b (e.g., client 101b) once communication device 103b is active and within range of data storage device 402.

As is illustrated in FIG. 4, data storage device 402 may be affixed to a page of a booklet 406, for example a user manual for health monitoring device 401 or a user manual for communication device 103b. Data storage device 402 may be fixed to booklet using a removable adhesive, so that data storage device 402 can be removed and placed in a more convenient location if desired, for example on health monitoring device 401, at a location where health monitoring device 401 is commonly used, or another location.

Once communication device 103b is paired with health monitoring device 401 and any necessary application software is installed on communication device 103b, communication device 103b may serve as a conduit for relaying health monitoring information from monitor 401 to remote server 405, for analysis, storage, review by a physician or other medical personnel, or for other purposes. Thus, sophisticated capabilities of communication device 103b can be used in ways not accessible through the simplified user input interface of communications device 103b.

While the example of FIG. 4 includes only one health monitoring device 401, multiple health monitoring devices could be paired with communication device 103b. For example, client 101b may use both a heart rate monitor and a blood glucose meter that periodically take readings from client 101b. Both devices could be paired with communication device 103b, and application software for both devices could be installed on communication device 103b if necessary. Communication device 103*b* can thus act as a hub for a network of health monitoring devices. The readings from the various health monitoring devices may be sent to the same or different remote locations.

Figure 5:
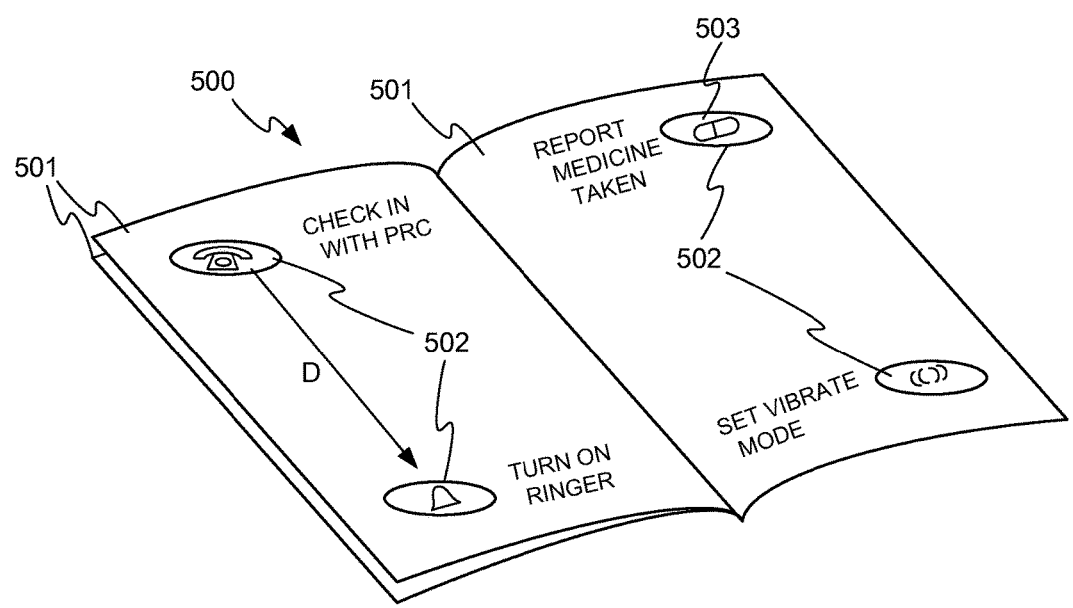
FIG. 5 illustrates a booklet in accordance with embodiments of the invention.

FIG. 5 illustrates a booklet 500 in accordance with other embodiments. Booklet 500 may be, for example, an instruction manual for a device such as communication device 103*b*, or a booklet prepared for another purpose. Booklet 500 has a number of pages 501. Two or more passive data storage devices 502 are affixed to one or more of pages 501, preferably using a removable adhesive. Each of passive data storage devices 502 is reactive to a wireless communication transceiver having a maximum range, for example an NFC transceiver, such that upon excitation, each of passive data storage devices 502 transmits at least some of the data it stores. Each of passive data storage devices 502 contains data different than the data stored in the other storage devices 502. When booklet 500 is open to show passive data storage devices 502, passive storage devices 502 are positioned farther apart than the maximum range of the wireless communication transceiver that will be used to read the stored data. For example, distance D may be larger than the range of short-range wireless communication transceiver 303 of communication device 103*b*.

Passive data storage devices 502 may be labeled with text or icons indicating functions that each of the devices may initiate in communication device 103*b*. A user such as client 101*b* can initiate the function by bringing communication device 103*b* within range of one of data storage devices 502. Communications device 103*b* may be programmed to recognize the particular data storage device 502, and act on the unique data read from it. For example, client 101*b* may place communication device 103*b* near particular storage device 503 when he or she has taken his or her scheduled medication. Communication device 103*b* can recognize the meaning of the data in storage device 503, and report via cellular network 105 that client 101*b* reports taking his or her medication. If no such report is received, staff at PRC 102 may place a call to client 101*b* to inquire why no report was received, and to remind client 101*b* to take his or her medication if necessary.

In other embodiments, communication device 103*b* simply reports the data received from the various storage devices 502, and any interpretation of the meaning of the data is performed at PRC 102.

Because storage devices 502 are spaced further apart than the range of short-range wireless communication transceiver 303, only one of the devices will be in range at any one time, and data collisions can be avoided.

If storage devices 502 are affixed to booklet 500 using a removable adhesive, client 101*b* may prefer to move the storage devices to more convenient locations. For example, storage device 503 could be placed in the door of a medicine cabinet, for convenient scanning when medications are removed from the cabinet and taken.

Thus, a system in accordance with embodiments of the invention can initiate functions of communication device 103*b* that are not accessible using the simplified user input interface of communication device 103*b*. A wide variety of initiated functions may be envisioned and initiated by "scanning" a data storage device such as an NFC tag with unique data. Example functions include calling phone numbers other than that of PRC 102, requesting technical help with the operation of communication device 103*b*, checking in with PRC 102 without placing a voice call to PRC, forcing the ascertaining and reporting of the geographic location of communication device 103*b* (and presumably client 101*b*), reporting starting and stopping times of exercise sessions, turning off and on features of communication device 103*b* for power conservation, and a wide variety of other functions.

In some embodiments, communication device 103*b* may use its limited input/output capabilities to provide feedback to the user that functions initiated by reading external data storage devices have actually occurred. For example, communication device 103*b* may be able to receive check-in calls from PRC 102, and in most cases may ring like a telephone. The user may wish to disable the ringing temporarily, for example to attend a social event, but may not wish to shut off communication device 103*b* completely. A special data storage tag 502 may, when its data is read, cause communication device 103*b* to enter a "vibrate only" mode, in which incoming calls are signaled by vibration rather than sound. Another data storage tag may cause communication device 103*b* to re-enable audible ringing. In either case, communication device 103*b* may signal its change in behavior appropriately. For example, when the vibrate-only mode is entered, communication device 103*b* may vibrate immediately to signal that he correct mode has been set. Similarly, when audible ringing is re-enabled, communication device 103*b* may ring briefly, to signal that audible ringing is active again.

According to other embodiments, the behavior of communication device 103*b* in reaction to data read from a data storage device such as an NFC tag may depend on the location of communication device 103*b*. For example, a user may place identical "check in" tags at his or her home or office. Scanning the tag at the client's office may cause communication device 103*b* to silence its ringer and enable vibration notification of incoming calls, while scanning the tag at the user's home may cause communication device 103*b* to re-enable its audible ringer and disable vibration notification. The data read from the two tags may be identical, but the initiated function varies by geographical location. This behavior may be configured via a website hosted by PRC 102, or by other means.

While the above example embodiments have been described in the context of a telephone or telephone-like device, other kinds of devices having simplified user interfaces may be used in embodiments of the invention. For example, an automotive keyless entry fob may be equipped with a short-range wireless transceiver such as an NFC transceiver, in addition to the medium-range wireless transceiver used to signal the automobile. The owner's manual for the automobile may include NFC tags or the like for indication certain configuration settings of features of the automobile. The automobile owner may hold the keyless entry fob near a particular tag, and data from the tag may be relayed by the fob to the automobile. The automobile may act on the information, for example to configure the automobile's sound system in a particular way specified by the data from the tag, or to select some other specified configuration that may be difficult to accomplish using other controls available in the automobile.

While the principles of the disclosure have been described above in connection with specific apparatuses and methods, it is to be clearly understood that this description is made only by way of example and not as limitation on the scope of the disclosure.

What is claimed is:

1. A portable communication device, comprising:
a processor;
a memory holding instructions for the processor;
a simplified user input interface for manually initiating at least one function of the portable communication device, wherein the simplified user input interface has fewer than 10 controls for initiating functions of the portable communication device;
a mobile telephone transceiver; and
a short-range wireless communication transceiver having a maximum working range of 30 cm or less;
wherein the instructions, when executed by the processor, cause the portable communication device to:
wirelessly detect an external data storage device via the short-range wireless communication transceiver of the portable communication device;
receive data stored in the external data storage device via the short-range wireless communication transceiver; and
initiate a particular function of the portable communication device, the particular function selected based on the content of the data received from the external data storage device, and the particular function not accessible via the simplified user input interface.

2. The portable communication device of claim 1, wherein the simplified user input interface includes a button that, when actuated, initiates a call to a predetermined telephone number.

3. The portable communication device of claim 2, wherein the simplified user input interface further comprises a volume control.

4. The portable communication device of claim 1, wherein the short-range wireless communication transceiver includes a near field communication (NFC) transceiver.

5. The portable communication device of claim 1, wherein the short-range wireless communication transceiver includes a radio frequency identification transceiver, an ultrasound transceiver, or an infrared transceiver.

6. The portable communication device of claim 1, wherein the portable communication device emits a radio frequency field via the short-range wireless communication transceiver, to excite the external data storage device.

7. The portable communication device of claim 1, further comprising a medium-range wireless communication transceiver, and wherein the particular function comprises sending pairing information to an active external device via the medium-range wireless communication transceiver.

8. The portable communication device of claim 7, wherein the medium-range wireless communication transceiver includes a Bluetooth wireless communication transceiver.

9. The portable communication device of claim 7, wherein the instructions, when executed by the processor, further cause the portable communication device to download, via the mobile telephone transceiver, application software for interacting with the active external device.

10. The portable communication device of claim 7, wherein the active external device is a health monitoring device, and wherein the instructions, when executed by the processor, further cause the portable communication device to: Amdt. dated Dec. 8, 2017 receive readings of health parameters from the active external device via the medium-range wireless communication transceiver; and forward the readings to a remote server via the mobile telephone transceiver.

11. The portable communication device of claim 10, wherein the active external device is selected from the group consisting of a heart rate monitor and a blood glucose monitor.

12. The portable communication device of claim 10, wherein the portable communication device is caused to detect the external data storage device, pair with the active external device, download the application software, and receive and forward the readings of health parameters without any interaction from a user of the portable electronic device once the portable electronic device is active and within range of the external data storage device.

13. The portable communication device as recited in claim 1, in combination with a booklet containing one or more pages and two or more particular passive external devices affixed to one or more of the pages, at least one of the particular passive external devices containing data different from the data in any other of the passive external devices contained in the booklet; wherein the passive external devices are reactive to the short-range wireless communication transceiver of the portable communication device, and are positioned farther apart in the booklet than the range of the short-range wireless communication transceiver.

* * * * *